Jan. 19, 1971   A. L. MORSELL III   3,555,814
INTERNAL COMBUSTION ENGINES
Filed Nov. 26, 1968   3 Sheets-Sheet 1

INVENTOR
ARTHUR L. MORSELL, III

BY
*Morsell & Morsell*
ATTORNEYS

Jan. 19, 1971  A. L. MORSELL III  3,555,814
INTERNAL COMBUSTION ENGINES
Filed Nov. 26, 1968  3 Sheets-Sheet 2
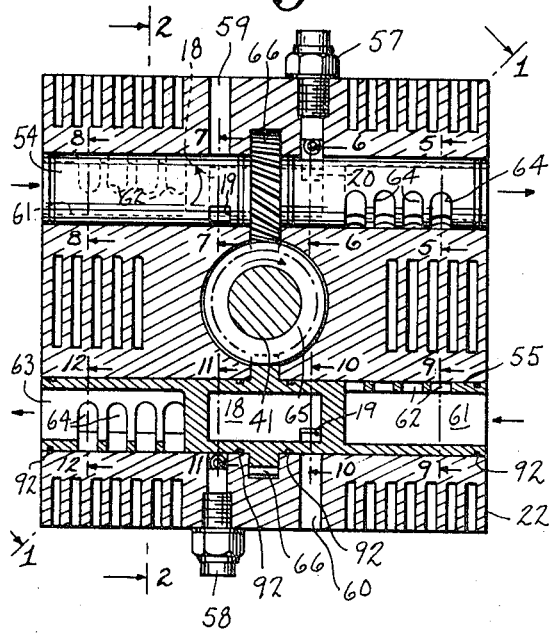
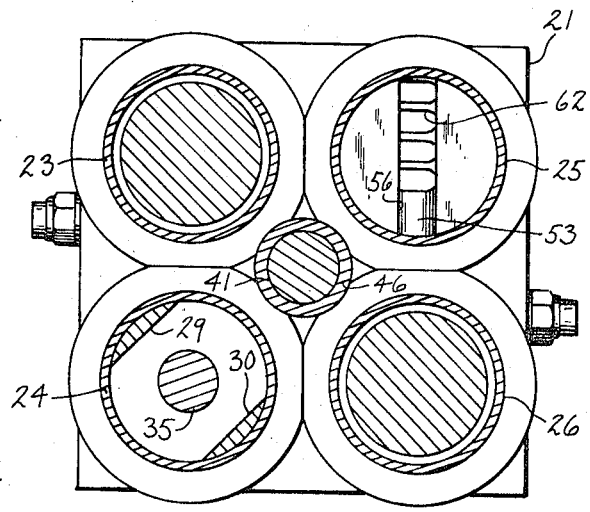
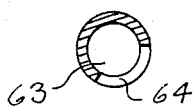 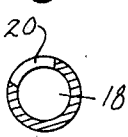 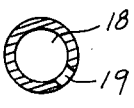 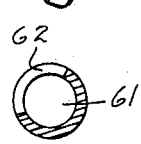
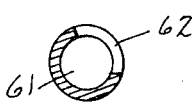 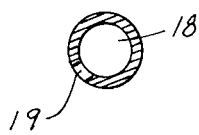 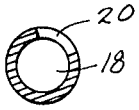 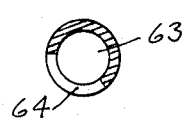
INVENTOR
ARTHUR L. MORSELL, III
BY
Morsell & Morsell
ATTORNEYS

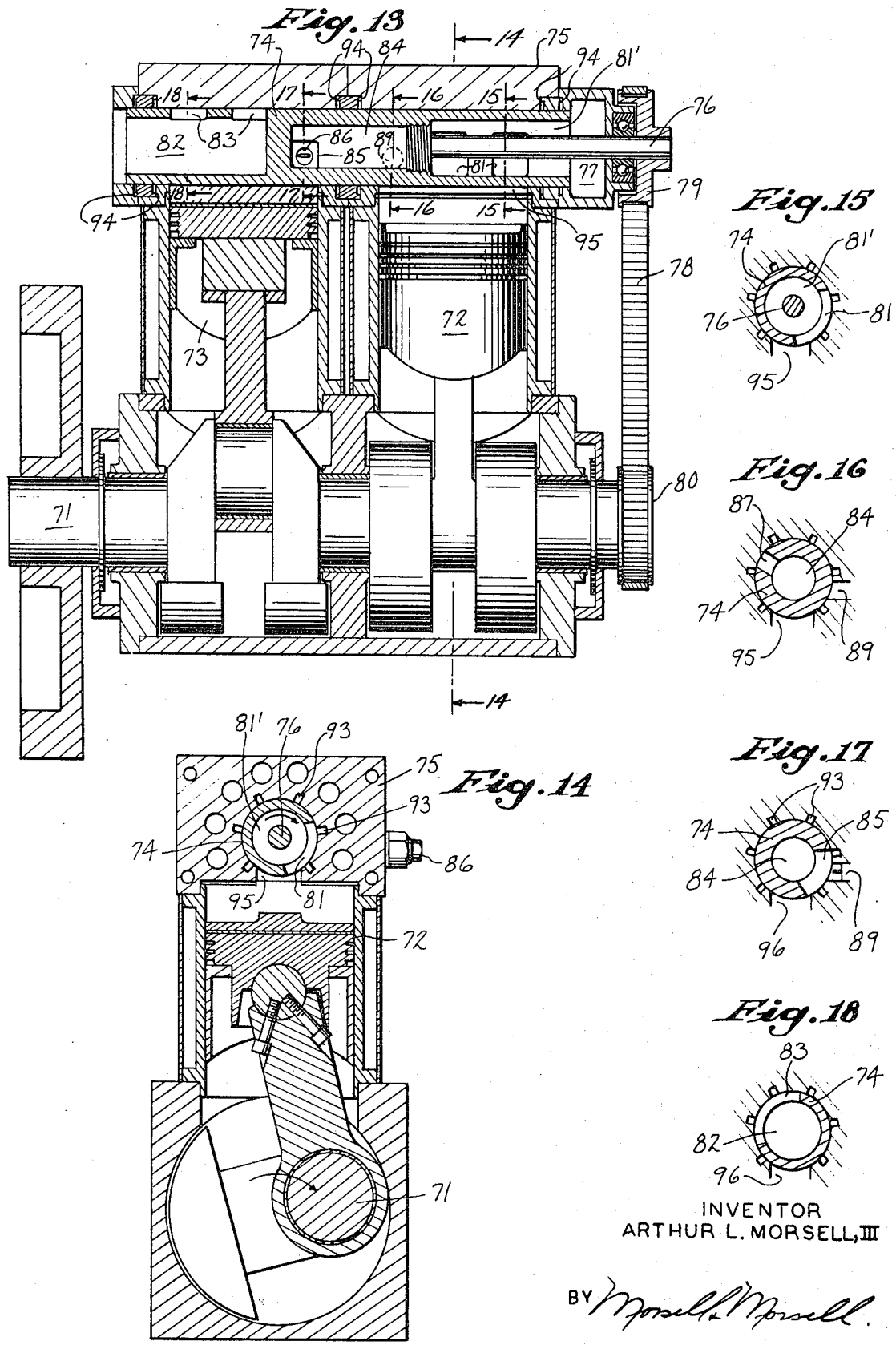

United States Patent Office
3,555,814
Patented Jan. 19, 1971

3,555,814
INTERNAL COMBUSTION ENGINES
Arthur L. Morsell III, 8820 SE. 63rd St.,
Mercer Island, Wash. 98040
Filed Nov. 26, 1968, Ser. No. 778,966
Int. Cl. F02g *3/02;* F02b *75/26*
U.S. Cl. 60—39.6                                               8 Claims

ABSTRACT OF THE DISCLOSURE

The engine has a rotating valve rod journalled in the cylinder head across the tops of two cylinders containing reciprocating pistons, one being a compression cylinder and the other an expansion cylinder; passageways including an intake chamber in the valve rod direct intake gases to the compression cylinder when the valve rod is in one position of rotation, and passageways including an exhaust chamber in the valve rod are adapted to exhaust gases from the expansion cylinder when the valve rod is in another position of rotation. An intermediate transfer chamber in the valve rod has a first port located for communication with the compression cylinder when the valve rod is in a predetermined position of rotation and has a second port located for communication with the expansion cylinder when the valve rod is in another predetermined position of rotation.

BACKGROUND OF THE INVENTION

Field of the invention

The invention pertains to those internal combustion engines which employ separate chambers for gas compression and gas expansin.

Description of the prior art

The invention is an improvement upon the structure disclosed in my prior Pat. No. 3,386,425 dated June 4, 1968, and an improvement upon the valving arrangement disclosed in Perugini Pat No. 1,138,783.

SUMMARY OF THE INVENTION

A preferred embodiment of the valve system consists of a rotating valve rod journalled in the cylinder head and extending across the tops of two cylinders containing reciprocating pistons, one being an expansion cylinder and the other a compression cylinder. passageways connect the chambers formed by the pistons and cylinders with the bore for the valve rod. The valve rod has chambers at each end, ducts in the sides communicating with the chambers in the ends, and a central chamber communicable with the outside. Rotation of the valve rod causes the various passageways to open and close in such a way that gas is ducted through one end of the valve rod into the compression cylinder, then compressed into the central cavity of the valve rod, where combustion is initiated, next expanded from the central cavity into the expansion cylinder, and finally exhausted from the expansion cylinder out through the other end of the valve rod.

The primary object of this invention is to provide a particularly simple and inexpensive valve system, readily adaptable to a variety of engine configurations, for handling all the gas flow processes required in an engine of the type employing separate chambers for compression and expansion.

Additional objects are as follows: (1) to make possible engine designs which are compact, light in weight, and inexpensive; (2) to take advantage of the increased efficiency and reduced demand on the cooling system resulting from the use of separate chambers for compression and expansion along with thermally insulated piston and cylinder heads; (3) to eliminate the timed spark ignition system usually used on conventional carburetted engines; and (4) to eliminate the combustion knock usually resulting from the use of low grade fuels in both diesel and carburetted engines. Knock is eliminated or greatly reduced because combustion takes place when the fuel-air mixture is isolated in a small chamber and the violent pressure forces resulting from detonation and rapid combustion cannot reach the pistons.

Further objects will appear in the subsequent descriptions.

BRIEF DESCRIPTION OF THE DRAWINGS

In the accompanying drawings, illustrating two embodiments of the invention, in which the same reference numerals designate the same parts in all of the views:

FIG. 3 is a transverse sectional view cutting through the valve rods taken on line 3—3 of FIG. 2;

FIG. 4 is a transverse sectional view cutting through the cylinders taken on the line 4—4 of FIG. 2;

FIGS. 5, 6, 7 and 8 are sectional views taken through the upper valve rod of FIG. 3 approximately on the lines 5—5, 6—6, 7—7 and 8—8, respectively, of FIG. 3;

FIGS. 9–12, inclusive, are similar sectional views through the lower valve rod of FIGS. 3 taken on the lines 9—9, 10—10, 11—11 and 12—12 of FIG. 3;

FIG. 13 is a longitudinal sectional view of an engine with a conventional crank arrangement, the view being taken through the axis of the valve rod and through the axis of the crank shaft, one of the pistons being shown in full and one being shown in section;

FIG. 14 is a transverse sectional view taken on the line 14—14 of FIG. 13; and

FIGS. 15–18, inclusive, are sectional views through the valve rod of the form of engine of FIG. 13 taken on the lines 15—15, 16—16, 17—17 and 18—18 respectively of FIG. 13.

DESCRIPTION OF THE PREFERRED EMBODIMENTS

Figure 1:
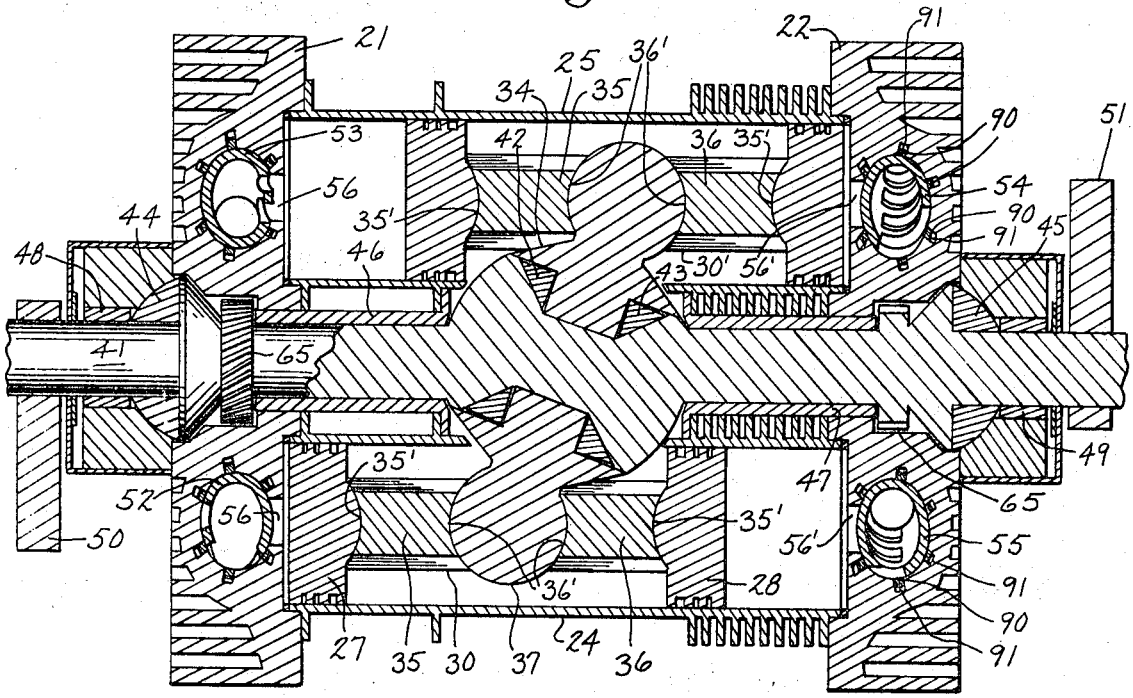
FIG. 1 is a longitudinal sectional view of a wobble plate engine. The view is taken on the line 1—1 of FIG. 3 and cuts through the centers of diagonally opposed cylinders.
Figure 2:
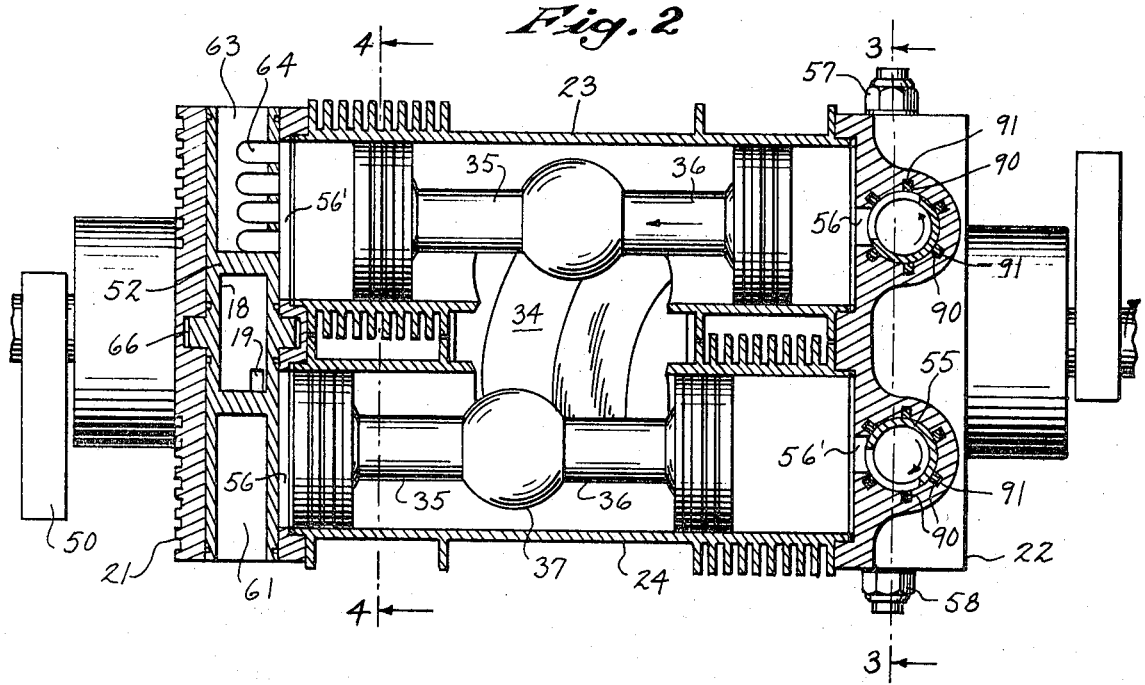
FIG. 2 is a longitudinal sectional view cutting through the centers of adjacent cylinders and taken on the line 2—2 of FIG. 3.

With reference to the engine configuration shown in FIGS. 1–4, the cylinder heads are designated by numerals 21 and 22. Between the heads are cylinders 23, 24, 25 and 26 containing piston assemblies, each consisting of two pistons rigidly joined together by connecting members. Pistons 27 and 28 in cylinder 24 are joined together by connecting webs 29 and 30 (see FIG. 4). The other piston sets are similarly connected. Connecting web 30 in cylinder 24 and connecting web 30' in cylinder 25 are visible in FIG. 1. The piston heads and cylinder heads are covered with thermally insulating material. The piston assemblies are linked to the wobble plate 34 by means of push rods 35 and 36 having shallow ball sockets 35' and 36' on each end engaging spherical surfaces on the wobble plate and on the insides of the pistons (see FIG. 1). The push rods 35 and 36 in cylinder 24 engage spherical projection 37 of the wobble plate and there is a similar engagement in the other cylinders.

The oblique central portion of shaft 41 rotates within the wobble plate and permits it to execute the wobbling motion characteristic of this type of mechanism. The wobble plate is prevented from rotating by interference of the spherical projections with the connecting webs 29 and 30 of the piston assemblies. The wobble plate bearings consist of rings 42 and 43 with conical inner surfaces bearing against conical surfaces on the oblique portion of the shaft. The rings engage the wobble plate only at the 90° corners and are sufficiently flexible to provide a self-adjusting feature and insure uniform mating of the bearing surfaces. Bearing rings 44 and 45 absorb the thrust forces between the shaft and the cylinder heads. The inner ends of shaft bearings 46 and 47 merge with the crankcase bulkheads (not shown). Shaft bearings 48 and 49 absorb radial forces due to balancing counterweights 50 and 51.

Rotating valve rods 52, 53, 54 and 55 carry helical gears 66 which engage helical gears 65 on the shaft. The valve rods 52 and 53 in the head 21 extend at right angles to the valve rods 54 and 55 in the head 22. Gear diameters and helix angles are such that the valve rods and the shaft rotate at the same speed. The valve rods each have a central cylindrical chamber 18 containing two holes; one hold 19 is capable of communicating with the opening 56 in the head of one of the compression cylinders and the other hole 20 is capable of communicating with opening 56' in the head of one of the adjacent expansion cylinders. The holes 19 and 20 are 180° apart and at opposite ends of the chamber. In FIG. 3 the hole 20 in valve rod 54 is indicated by dotted lines. One cylinder head opening 56 in cylinder 25 is visible in FIG. 4. In addition, hole 20 in the central chamber can communicate with an ignitor 57 or 58 and hole 19 with an auxiliary exhaust passage 59 or 60. Ignitors 57 and 58 and auxiliary exhaust passages 59 and 60 are visible in FIG. 3.

A hole 61 in one end of each valve rod communicates with rows of ports 62 in the sides of the rod. A hole 63 in the other end of each valve rod communicates with rows of ports 64. These ports are capable of communicating with the openings 56 or 56' in the cylinder heads. The ports 62 near one end of the rod rotating across the opening 56 in a compression cylinder head (such as the opening 56 of FIG. 4) act as an intake valve and the ports 64 near the other end rotating across the opening 56' in an expansion cylinder head act as an exhaust valve. Gas sealing may be accomplished by means of spring-loaded vanes in the cylinder head or some other convenient means. Vanes 90 are visible in FIGS. 1 and 2. The vanes run parallel to the valve rod axis and are spring loaded by band springs 91 to press radially inward against the valve rod. Six vanes surround each end of each valve rod and extend between sealing rings at the ends and near the center of the valve rods. Sealing rings 92 are shown in FIG. 3. Arrows at the valve rod ends on FIG. 3 show the directions of gas flow; thus carburetted air enters through the left end of the upper valve rod in FIG. 3 and the combustion products exit from the right-hand end.

In the figures the expansion cylinders appear similar to the compression cylinders, since the openings in the cylinder heads and the valve configurations are almost identical for the two types of cylinders. They may be differentiated by noting that in FIGS. 1 and 2 the compression cylinders are shown without fins and in FIG. 3 the ignitors are located next to the expansion cylinders.

As the four piston assemblies reciprocate in their cylinders, thrust applied successively to the four pistons in the expansion chambers is transmitted to the wobble plate causing it to wobble and thus impart rotation to the shaft 41, from which useful power many be taken. The rotation of the shaft is transmitted to the four valve rods 52, 53, 54 and 55 by means of crossed helical gears 65 and 66. The rotating valve rods control the flow of gas through the engine. As the piston in a compression cylinder moves away from the head, air-fuel mixture is drawn in through the valve rod ports such as the ports 62 of FIG. 3, which are in communication with one of the openings 56 in the head. After the piston has reached bottom dead center, the intake ports rotate out of communication with the head opening 56 and compression of the air-fuel mixture begins. When the piston has moved about half way toward top dead center, one of the holes (the compression transfer port 19) to the transfer chamber 18 in the valve rod is exposed in one of the head openings 56 and the air-fuel mixture is transferred to the transfer chamber as compression continues. When the piston reaches top dead center, the compression transfer port 19 is closed by the valve rod rotation and almost all of the compressed charge is trapped in the transfer chamebr. About 45° of crank rotation later the other hole 20 (expansion transfer port) in the transfer chamber 18 is rotated into communication with the ignitor 57 or 58 (a glow plug or equivalent device) and combustion begins. In another 45° of crank rotation combustion should be complete, the temperature and pressure should be very high, and the expansion transfer port 20 comes into communication with one of the openings 56' in the head of an expansion cylinder (adjacent to the compression cylinder). The combustion products enter the expansion cylinder and exert a force on the piston, which is near top dead center. As the piston in the expansion chamber is forced away from the head, the gas in the transfer chamber expands through the expansion transfer port. About 130° of crank rotation later the expansion transfer port 20 in the valve rod has rotated out of communication with the head opening 56' and into communication with an auxiliary exhaust passage 59 or 60. At about the same time the exhaust ports 64 in the valve rod begin to communicate with a head opening 56'. The transfer chamber exhausts through an auxiliary exhaust passage 59 or 60 for about 45° of crank rotation, after which the compression transfer process beings again. The exhaust process in the expansion cylinder continues for about 180° of crank rotation; then the exhaust ports 64 are closed; and when the piston reaches top dead center, the expansion transfer process begins again.

Ignition could also be initiated by the hot surfaces of the expansion piston and cylinder head during the expansion transfer process. However, because of the considerable time required for combustion, it appears desirable to ignite the mixture somewhat earlier. In addition, the effects of engine knock are greatly reduced if combustion takes place in a compact chamber isolated from the piston.

With reference to the engine configuration shown in FIGS. 13 and 14, the two crank throws of crankshaft 71 are arranged so that the motion of compression chamber piston 72 precedes that of expansion chamber piston 73 by a time equivalent to about 75° of crank rotation. Valve rod 74 is caused to rotate in cylinder head 75 by means of torque transmitted through valve rod shaft 76 extending out through intake passage 77. The crankshaft motion is transmitted to the valve rod shaft by means of toothed belt 78 and toothed pulleys 79 and 80.

The intake passage communicates through the right-hand end of the valve rod with intake ports 81 in intake chamber 81', the ports being in the side of the valve rod. The exhaust chamber 82 communicates through the left-hand end of the valve rod with exhaust ports 83 in the side of the valve rod. Central cavity 84 (the transfer chamber) in the valve rod has two holes: one hole 85 (expansion transfer port) is capable of communicating with the opening 96 in the head of the expansion cylinder and also with ignitor 86, the inner end of which is visible through hole 85 in FIG. 13; the other hole 87 (compression transfer port) in the cavity is capable of communicating with the opening 95 in the head of the compression cylinder and with the auxiliary exhaust passage 89 but is visible only in FIG. 16. Auxiliary exhaust passage 89 is hidden behind the valve rod in FIG. 13 and its position is indicated by a dashed line. Sealing of the high-pressure gas is accomplished by means of spring-loaded vanes 93 extending between sealing rings 94. The intake chamber 81' is communicable with the compression cylinder through passageway 95 (see FIG. 15). The exhaust chamber is communicable with the exhaust cylinder through passageway 96 (see FIG. 18).

Except for the manner in which motion is transmitted from the expansion piston to the crankshaft and from the crankshaft to the compression piston and to the valve rod, the operation of this engine is essentially identical with the operation of the wobble plate engine described previously, although the precise crank angles at which various processes occur can vary depending on the angular amount by which the motion of the compression piston precedes the motion of the expansion piston.

The carburetted engines described above can be converted to diesel or compression-ignition engines simply by eliminating the carburettor, by providing a timed fuel-injection system, and by replacing the ignitor with a fuel injection nozzle. The compression ratio should be high enough to give a temperature after compression sufficient to ignite the fuel. Fuel is injected into the transfer chamber just after compression is complete, and, as in the carburetted engine, combustion takes place while the burning mixture is isolated from both the compression cylinder and the expansion cylinder. Because combustion in compression-ignition engines is often quite violent, this isolation of the compression process will eliminate much of the noise and vibration associated with conventional compression-ignition engines.

Various changes and modifications may be made without departing from the spirit of the invention, and all of such changes are contemplated as may come within the scope of the claims.

What is claimed is:

1. In a combustion engine having a rotatable output shaft, having compression and expansion cylinders, having a piston for each cylinder, and having a head for said cylinders, a rotatably mounted valve rod in said head extending in a direction transversely of said cylinders, means including an intake chamber in said valve rod for directing intake gases to said compression cylinder when the valve rod is in one position of rotation; means including an exhaust chamber in said valve rod for exhausting gases from said expansion cylinder when said valve rod is in another position of rotation, said valve rod having a transfer chamber with a first port located for communication with said compression cylinder when the valve rod is in a predetermined position of rotation whereby said transfer chamber may receive a compressed charge, means for causing combustion of the charge to take place in said transfer chamber, said transfer chamber having a second port located for communication with the expansion cylinder when the valve rod is in another predetermined position of rotation whereby the expanding charge may be transferred to the expansion cylinder, and means for driving the valve rod with uniform rotary motion in timed relationship with the output shaft.

2. An engine as claimed in claim 1 in which there is auxiliary exhaust means in the head communicable with one of the ports in the transfer chamber when the valve rod is in a predetermined position of rotation for exhausting residual gases from the transfer chamber after the latter has transferred its charge to the expansion cylinder.

3. An engine as claimed in claim 1 in which the intake chamber in the valve rod is formed by a bore extending inwardly from one end of the valve rod, in which the exhaust chamber is formed by a bore extending inwardly from the other end of the valve rod, and in which the transfer chamber is formed by a separate intermediate bore.

4. An engine as claimed in claim 1 in which there is an ignition device in the head, and in which one of the ports of the transfer chamber is in communication with said ignition device when the valve rod is in a predetermined position of rotation.

5. A combustion engine as claimed in claim 1 in which there is an even number of opposed sets of compression and expansion cylinders, the sets being in parallelism with each other and arranged in circular formation around the output shaft, there being a single central wobble mechanism between the pistons for the sets of cylinders and the output shaft for transmitting movement from the opposed pistons to the output shaft, the compression and expansion cylinders of one set being arranged in alternating relationship with respect to the compression and expansion cylinders of adjacent sets, and there being a valve rod for each pair of adjacent compression and expansion cylinders at each end of the engine.

6. A combustion engine as claimed in claim 1 in which the rotatable valve rod has a cylindrical wall and in which the intake chamber, exhaust chamber and transfer chamber are all contained within said cylindrical wall.

7. A combustion engine as claimed in claim 1 in which the intake chamber, exhaust chamber and transfer chamber are all cylindrical and in generally axial alignment in the valve rod and in which the transfer chamber is located between the intake and exhaust chambers.

8. A combustion engine as claimed in claim 1 in which the intake chamber in the valve rod is formed by a bore extending inwardly from one end of the valve rod, in which the exhaust chamber and transfer chamber are formed by bore portions extending inwardly from the other end of the valve rod, with the transfer chamber located intermediate the intake and exhaust chambers, there being a partition separating one of the end chambers from the transfer chamber, and there being a plug separating the transfer chamber from the other end chamber, a shaft projecting outwardly fom said plug through the adjacent chamber, said means for driving the valve rod including a driving connection with said shaft.

References Cited

UNITED STATES PATENTS

| | | | |
|---|---|---|---|
| 611,125 | 9/1898 | Humphrey | 60—39.6 |
| 1,138,783 | 5/1915 | Perugini | 60—39.6X |
| 1,799,772 | 4/1931 | Wormley | 60—39.6 |
| 2,131,216 | 9/1938 | Brooke | 60—39.6 |
| 3,386,425 | 6/1968 | Morsell III | 123—58 |

FOREIGN PATENTS

| | | | |
|---|---|---|---|
| 282,075 | 2/1915 | Germany | 60—39.6 |
| 76,135 | 11/1917 | Switzerland | 60—39.6 |

WENDELL E. BURNS, Primary Examiner

U.S. Cl. X.R.

123—58